US012399443B2

(12) United States Patent
Hiraide

(10) Patent No.: US 12,399,443 B2
(45) Date of Patent: Aug. 26, 2025

(54) IMAGE FORMING APPARATUS FOR PRINTING IMAGE USING BRILLIANT TONER ON RECORDING MEDIUM

(71) Applicant: Oki Electric Industry Co., Ltd., Tokyo (JP)

(72) Inventor: Manami Hiraide, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 845 days.

(21) Appl. No.: 17/579,373

(22) Filed: Jan. 19, 2022

(65) Prior Publication Data

US 2022/0334508 A1 Oct. 20, 2022

(30) Foreign Application Priority Data

Apr. 19, 2021 (JP) ................................ 2021-070238

(51) Int. Cl.
*G03G 9/09* (2006.01)

(52) U.S. Cl.
CPC .................................. *G03G 9/0926* (2013.01)

(58) Field of Classification Search
CPC ....................... G03G 15/5029; G03G 15/6585
See application file for complete search history.

(56) References Cited

U.S. PATENT DOCUMENTS 9,201,338 B2 * 12/2015 Kubo ................ G03G 15/5029
9,377,729 B1 * 6/2016 Nakamura ......... G03G 15/2039
11,614,696 B2 * 3/2023 Yamada .................. B41M 3/12
156/241
11,703,786 B2 * 7/2023 Shimodaira ........ G03G 15/6591
399/328
2014/0043623 A1 2/2014 Koyatsu et al.
2014/0093267 A1 * 4/2014 Kubo ................ G03G 15/2046
399/69
2018/0143553 A1 5/2018 Kuwabara
2020/0270470 A1 * 8/2020 Boldes (Golan) ..... C09D 11/38
2020/0341397 A1 10/2020 Matsumoto

FOREIGN PATENT DOCUMENTS

EP 3147714 A1 3/2017
JP 2015087513 A 5/2015
JP 2018-084677 A 5/2018
JP 2020085987 A 6/2020

* cited by examiner

*Primary Examiner* — Arlene Heredia
(74) *Attorney, Agent, or Firm* — Rabin & Berdo, P.C.

(57) ABSTRACT

An image forming apparatus includes: an image forming unit that forms an image with a brilliant toner on a recording medium; a medium color determiner that determines whether the recording medium is white or colored; and an image forming controller that controls the image forming unit. When the medium color determiner determines that the recording medium is colored, the image forming controller increases an amount of the brilliant toner per unit area of the image formed on the recording medium as compared to when the recording medium is white.

7 Claims, 7 Drawing Sheets

| MEDIUM COLOR | MEDIUM NAME | $FI_0$ | SPECULAR REFLECTANCE (%) |
|---|---|---|---|
| WHITE PAPER | OS coated paper W | 4.0 | 69.8 |
| | Excellent Gloss | 4.6 | 56.1 |
| | Color Copy | 5.6 | 14.6 |
| | Excellent White | 5.3 | 8.2 |
| BLACK PAPER | Kishu Colored High Quality Paper | 8.0 | 4.4 |
| BLUE PAPER | Kishu Colored High Quality Paper | 7.0 | 5.9 |
| RED PAPER | Kishu Colored High Quality Paper | 7.3 | 5.7 |

| "BRILLIANT TONER A" CONTAINING BRILLIANT PIGMENT HAVING VOLUME MEDIAN SIZE OF 5.4 μm | | | | |
|---|---|---|---|---|
| BRILLIANT TONER DEPOSITION AMOUNT mg/cm² | ΔFI | | | |
| | WHITE PAPER | BLACK PAPER | BLUE PAPER | RED PAPER |
| 0.20 | 7.0 | 4.8 | 6.5 | 5.8 |
| 0.24 | 7.6 | 5.4 | 5.9 | 6.3 |
| 0.30 | 7.2 | 5.9 | 7.4 | 7.0 |
| 0.36 | 8.1 | 9.2 | 7.2 | 7.6 |
| 0.40 | 5.9 | 8.3 | 8.0 | 8.1 |
| 0.47 | 6.5 | 9.6 | 8.0 | 7.4 |
| 0.53 | 5.8 | 9.6 | 7.7 | 7.8 |
| 0.60 | 4.9 | 8.4 | 8.2 | 8.1 |
| 0.65 | 4.4 | 7.8 | 7.6 | 7.4 |

| BRILLIANT TONER B | | | | |
|---|---|---|---|---|
| BRILLIANT TONER DEPOSITION AMOUNT $mg/cm^2$ | ΔFI | | | |
| | WHITE PAPER | BLACK PAPER | BLUE PAPER | RED PAPER |
| 0.22 | 6.4 | 9.8 | 3.4 | 3.7 |
| 0.25 | 7.5 | 9.7 | 3.6 | 3.4 |
| 0.32 | 9.2 | 11.2 | 5.8 | 5.2 |
| 0.34 | 8.8 | 11.0 | 4.8 | 6.6 |
| 0.42 | 3.3 | 11.4 | 4.4 | 5.1 |
| 0.48 | 4.4 | 10.9 | 5.2 | 5.8 |
| 0.53 | 4.3 | 9.0 | 5.9 | 6.7 |
| 0.60 | 3.7 | 12.2 | 6.9 | 6.8 |
| 0.67 | 3.0 | 8.4 | 4.9 | 5.7 |

*FIG. 11*

| PRINTING SPEED (ppm) (A4 LANDSCAPE) | | 18 | 22 | 27 | 32 | 40 |
|---|---|---|---|---|---|---|
| LINEAR SPEED (mm/s) | | 86 | 105.1 | 129 | 152.8 | 191.1 |
| OS coated paper 127.9 ($g/m^2$) | BRILLIANT TONER DEPOSITION AMOUNT | 0.31 | 0.32 | 0.32 | 0.33 | 0.36 |
| | FI | 13.1 | 11.6 | 9.8 | 9.4 | 8.9 |
| Kishu Colored High Quality Paper BLACK 90.7 ($g/m^2$) | BRILLIANT TONER DEPOSITION AMOUNT | 0.32 | 0.32 | 0.34 | 0.35 | 0.35 |
| | FI | 17.2 | 15.9 | 15.0 | 15.1 | 14.8 |
| Kishu Colored High Quality Paper BLUE 90.7 ($g/m^2$) | BRILLIANT TONER DEPOSITION AMOUNT | 0.31 | 0.34 | 0.34 | 0.35 | 0.37 |
| | FI | 12.4 | 14.5 | 13.2 | 12.7 | 11.9 |
| Kishu Colored High Quality Paper RED 90.7 ($g/m^2$) | BRILLIANT TONER DEPOSITION AMOUNT | 0.33 | 0.34 | 0.34 | 0.35 | 0.37 |
| | FI | 13.7 | 12.8 | 14.6 | 13.1 | 13.1 |

IMAGE FORMING APPARATUS FOR PRINTING IMAGE USING BRILLIANT TONER ON RECORDING MEDIUM

BACKGROUND OF THE INVENTION

1. Field of the Invention

The present disclosure relates to an electrophotographic image forming apparatus that uses a brilliant toner containing a brilliant pigment for printing.

2. Description of the Related Art

Japanese Patent Application Publication No. 2018-84677 discloses improving the metallic appearance (or brilliance) of images printed by an image forming apparatus using a brilliant toner containing a brilliant pigment, by specifying the brilliant pigment contained in the brilliant toner.

However, in some cases, depending on the color of the recording medium, sufficient brilliance cannot be obtained only by specifying the brilliant pigment.

SUMMARY OF THE INVENTION

An aspect of the present invention is intended to provide good brilliance regardless of whether the recording medium is white or colored.

According to an aspect of the present disclosure, there is provided an image forming apparatus including: an image forming unit that forms an image with a brilliant toner on a recording medium; a medium color determiner that determines whether the recording medium is white or colored; and an image forming controller that controls the image forming unit, wherein when the medium color determiner determines that the recording medium is colored, the image forming controller increases an amount of the brilliant toner per unit area of the image formed on the recording medium as compared to when the recording medium is white.

BRIEF DESCRIPTION OF THE DRAWINGS

In the attached drawings:

FIG. 11 is a table showing the flop indexes of recording media subjected to printing at different printing speeds.

DETAILED DESCRIPTION OF THE INVENTION

Figure 1:
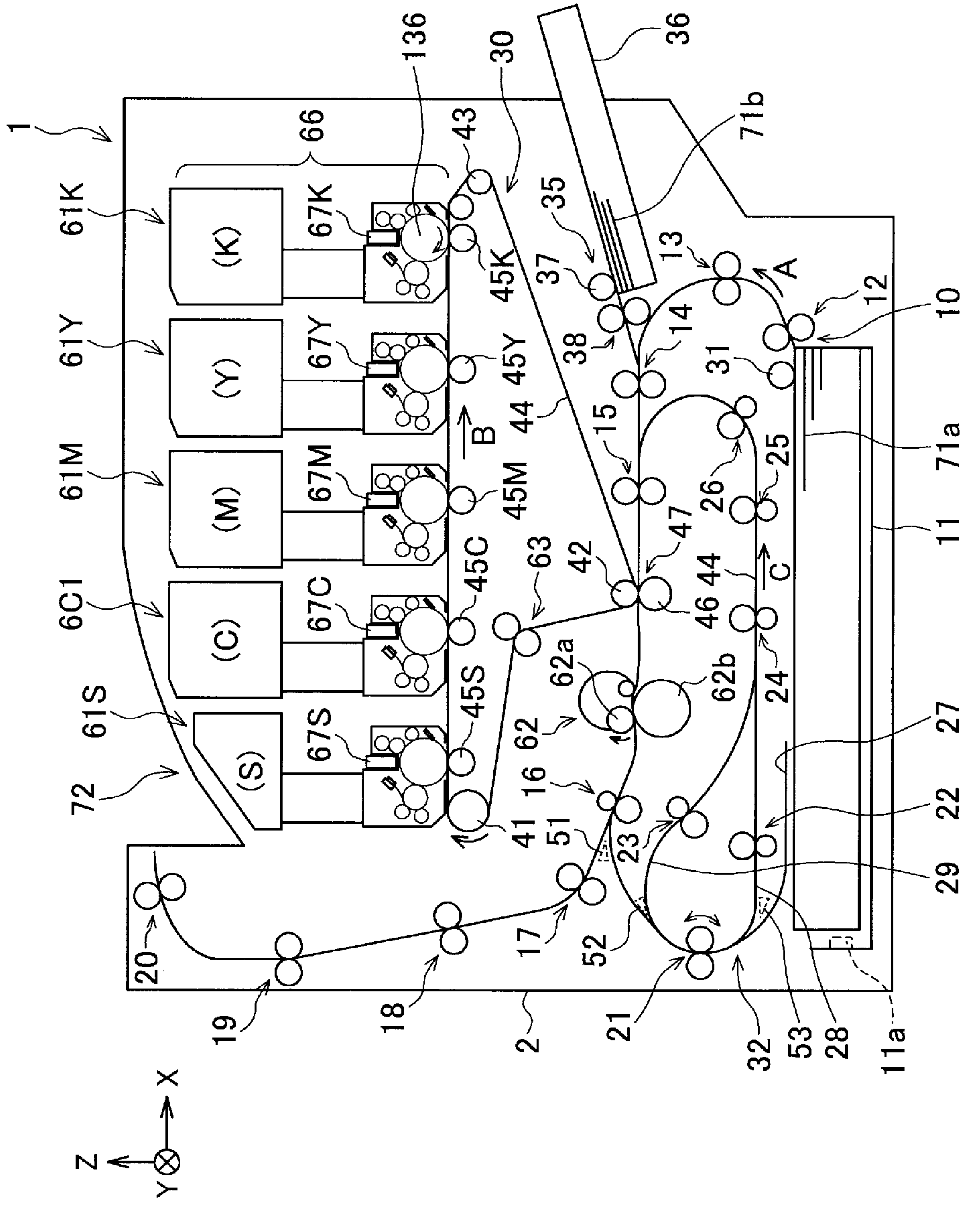
FIG. 1 is a view illustrating a configuration of main parts of a printer as an image forming apparatus of an embodiment according to the present disclosure.

FIG. 1 is a view illustrating a configuration of main parts of a printer 1 as an image forming apparatus of an embodiment according to the present disclosure.

The printer 1 is a color electrophotographic printer of an intermediate transfer system capable of printing five colors of black (K), yellow (Y), magenta (M), cyan (C), and a special color (S). The special color (S) is a special color, such as gold or silver, exhibiting metallic luster, i.e., having brilliance. The special color may be used alone or in combination with the normal colors (i.e., black, yellow, magenta, and cyan) in a superimposed manner. The present embodiment according to the present disclosure describes an example in which the special color is silver.

As illustrated in FIG. 1, a first sheet feeding cassette 11 stores recording sheets 71*a* (e.g., paper sheets) as recording media stacked therein. A pickup roller 31 and a pair of sheet feeding rollers 12 pick up the recording sheets 71*a* from the first sheet feeding cassette 11 and sequentially feed them one by one to a conveying path. A pair of conveying rollers 13 for conveying the recording sheet 71*a* along the conveying path, a pair of registration rollers 14 for correcting skew of the recording sheet 71*a*, and a pair of timing rollers 15 for feeding the recording sheet 71*a* to a secondary transfer portion 47 at a predetermined time are sequentially disposed downstream of the pair of sheet feeding rollers 12 in the direction of arrow A, which indicates a convening direction of the recording sheet 71*a*. The first sheet feeding cassette 11, pickup roller 31, and pair of sheet feeding rollers 12 constitute a first sheet feeder 10.

Also, a second sheet feeder 35 is provided upstream of the pair of registration rollers 14. The second sheet feeder 35 includes a second sheet feeding cassette 36, a pickup roller 37, and a pair of sheet feeding rollers 38. The second sheet feeding cassette 36 stores recording sheets 71*b* (e.g., paper sheets) as recording media stacked therein. The pickup roller 37 and pair of sheet feeding rollers 38 pick up the recording sheets 71*b* from the second sheet feeding cassette 36 and sequentially feed them one by one to the pair of registration rollers 14.

A recording sheet 71*a* or 71*b* is selectively fed to the pair of registration rollers 14 from the first sheet feeder 10 and second sheet feeder 35. Hereinafter, when the recording sheets 71*a* and 71*b* need not be distinguished from each other, they will be referred to as recording sheets 71.

A developed image forming unit 66 includes five image drum units (referred to below as ID units) 61S, 61C, 61M, 61Y, and 61K that respectively form developer images of the special color (S), cyan (C), magenta (M), yellow (Y), and black (K) and five light emitting diode (LED) heads 67S, 67C, 67M, 67Y, and 67K. When the ID units 61S, 61C, 61M, 61Y, and 61K need not be distinguished from each other, they will be referred to simply as ID units 61. When the LED heads 67S, 67C, 67M, 67Y, and 67K need not be distinguished from each other, they will be referred to simply as LED heads 67.

The five ID units 61S to 61K are arranged along the direction of arrow B indicating a movement direction in which an intermediate transfer belt 44 of an intermediate transfer belt unit 30 (to be described later) moves in an upper portion of the intermediate transfer belt unit 30, and are arranged in order from the upstream side in the direction of arrow B. The five LED heads 67S to 67K are arranged to face the respective ID units 61S to 61K to illuminate predetermined portions of photosensitive drums 136 of the ID units 61 as described later.

In FIG. 1, the X axis is taken in the movement direction in which the intermediate transfer belt 44 moves in the upper portion of the intermediate transfer belt unit 30, the Y axis is taken in a rotation axis direction of the photosensitive drums 136, and the Z axis is taken in a direction perpendicular to both the X and Y axes. The X, Y, and Z axes illustrated in the other drawings (to be described later) indicate the same directions. Specifically, the X, Y, and Z axes in each drawing indicate arrangement directions when the part illustrated in the drawing constitutes the printer 1 illustrated in FIG. 1. Here, it is assumed that the Z axis is oriented in a substantially vertical direction.

Figure 2:
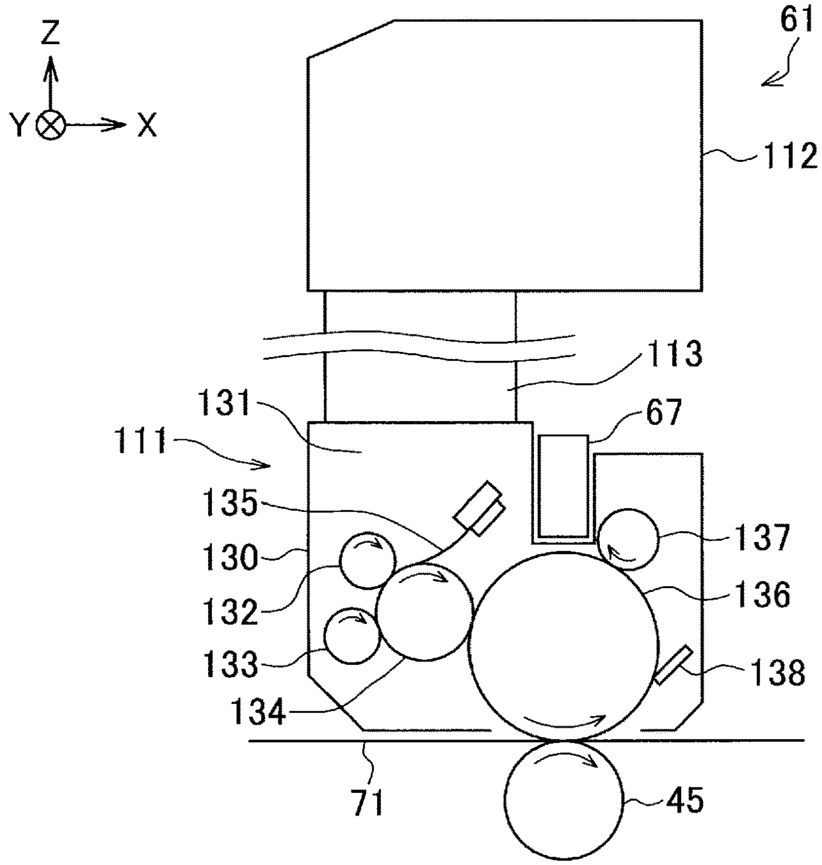
FIG. 2 is a view illustrating an internal configuration of an ID unit.

Internal configurations of the ID units 61 are the same, and thus will be described by taking the ID unit 61K for black (K) as an example. FIG. 2 is a view illustrating the internal configuration of the ID unit 61. In FIG. 1, the ID units 61 are illustrated such that the shape of a developer container 112 (see FIG. 2) of the ID unit 61S is different from the shapes of developer containers 112 of the other ID units 61.

As illustrated in FIG. 2, the ID unit 61 is generally constituted by an image forming main portion 111, the developer container 112, a developer supply portion 113, and the LED head 67. The ID unit 61 and parts thereof have sufficient lengths in the Y axis direction corresponding to the length of the recording sheet 71 in the Y axis direction. Thus, many of the parts are longer in the Y axis direction than in the X and Z axis directions, and formed in shapes elongated in the Y axis direction.

The developer container 112 contains developer, and is configured to be attachable to and detachable from a main body of the ID unit 61. When the developer container 112 is attached to the main body of the ID unit 61, it is attached to the image forming main portion 111 through the developer supply portion 113.

Figure 3:
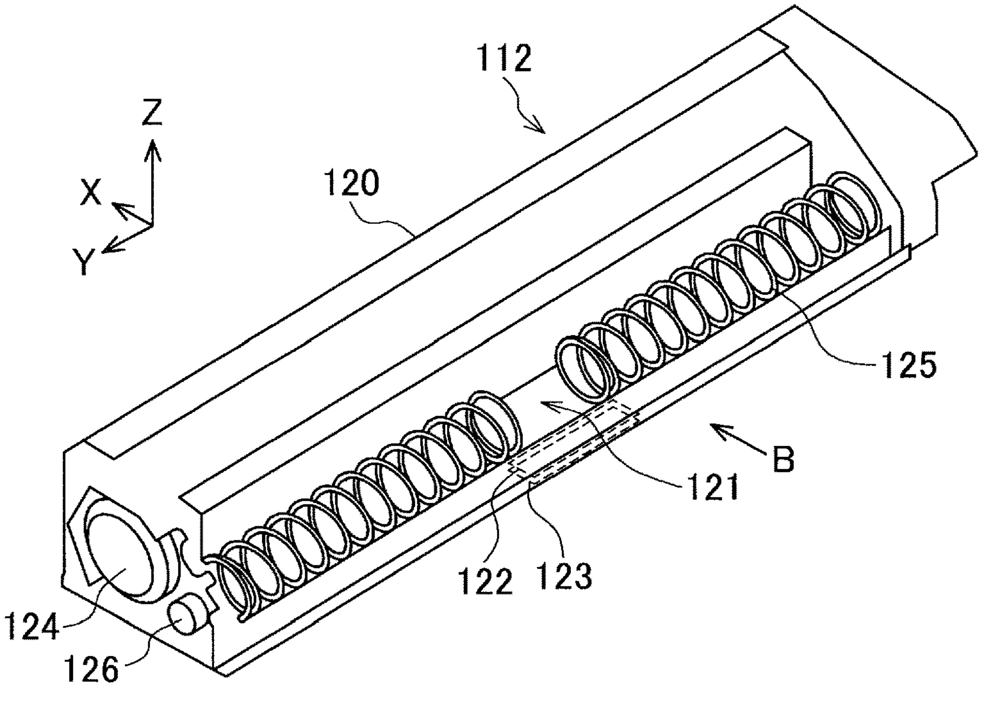
FIG. 3 is an external perspective view of a developer container schematically illustrating an interior of the developer container with part of an exterior of the developer container omitted.

FIG. 3 is an external perspective view of the developer container 112 schematically illustrating an interior of the developer container 112 with part of an exterior of the developer container 112 omitted. As illustrated in FIG. 3, the developer container 112 includes a container housing 120 extending in the Y axis direction. A storage chamber 121, which is a cylindrical space extending in the Y axis direction, is formed in the container housing 120. The storage chamber 121 contains the developer. Hereinafter, the leftward, rightward, forward, rearward, upward, and downward directions may be defined as viewed from the direction of arrow B illustrated in FIG. 3 (or the negative side in the X axis direction).

Substantially at a center of a bottom of the storage chamber 121 in the left-right direction, a supply opening 122 through which a space in the storage chamber 121 communicates with the external space is formed, and a shutter 123 that opens and closes the supply opening 122 is provided. The shutter 123 is connected to a lever 124, and opens or closes the supply opening 122 in accordance with rotation of the lever 124. The lever 124 is operated by a user when the developer container 112 is attached to or detached from the ID unit 61.

For example, in a state in which the developer container 112 is not attached to the ID unit 61 (see FIG. 2), the shutter 123 closes the supply opening 122 and prevents the developer contained in the storage chamber 121 from leaking to the outside. When the developer container 112 is attached to the ID unit 61, the lever 124 is rotated in a predetermined opening direction, thereby moving the shutter 123 to open the supply opening 122.

This makes the space in the storage chamber 121 communicate with a space in the developer supply portion 113, and the developer in the storage chamber 121 of the developer container 112 is supplied to the image forming main portion 111 through the developer supply portion 113. Also, when the developer container 112 is detached from the ID unit 61, the lever 124 is rotated in a predetermined closing direction, thereby moving the shutter 123 to close the supply opening 122.

Also, an agitator 125 is disposed in the storage chamber 121. The agitator 125 is formed in a shape such that an elongated member is spiraled about an imaginary central axis extending along the left-right direction, and is rotatable about the imaginary central axis in the storage chamber 121. An agitator driver 126 is disposed at an end of the container housing 120.

The agitator driver 126 is connected to the agitator 125. When the agitator driver 126 is supplied with a driving force from a predetermined drive source disposed in a housing 2 (see FIG. 1), it transmits the driving force to the agitator 125 and rotates the agitator 125. Thereby, the developer container 112 can agitate the developer contained in the storage chamber 121, and prevent the developer from aggregating and feed the developer to the supply opening 122.

The image forming main portion 111 (see FIG. 2) includes an image forming housing 130, a developer storage space 131, a first supply roller 132, a second supply roller 133, a developing roller 134, a developing blade 135, the photosensitive drum 136, a charging roller 137, and a cleaning blade 138. The first supply roller 132, second supply roller 133, developing roller 134, photosensitive drum 136, and charging roller 137 are each formed in a cylindrical shape having a central axis extending in the left-right direction and rotatably supported by the image forming housing 130.

In the ID unit 61S for the special color (S), the developer container 112 contains a brilliant toner (to be described later) as a developer and is attached to the image forming main portion 111 through the developer supply portion 113.

The developer storage space 131 contains the developer supplied from the developer container 112 through the developer supply portion 113. The first supply roller 132 and second supply roller 133 each include an elastic layer that is formed by conductive urethane rubber foam or the like and forms a periphery of the roller. The developing roller 134 includes an elastic layer, a conductive surface layer, or the like forming a periphery of the roller. The developing blade 135 is formed by, for example, a stainless steel sheet having a predetermined thickness, and a part of the developing blade 135 abuts the periphery of the developing roller 134 with the developing blade 135 slightly elastically deformed.

The photosensitive drum 136 includes a thin-film charge generation layer and a thin-film charge transport layer that are sequentially formed and form a periphery of the drum, and is chargeable. The charging roller 137 includes a conductive elastic body that forms a periphery of the roller. The periphery of the charging roller 137 abuts the periphery of the photosensitive drum 136. The cleaning blade 138 is formed by, for example, a thin-plate-shaped resin member, and a part of the cleaning blade 138 abuts the periphery of the photosensitive drum 136 with the cleaning blade 138 slightly elastically deformed.

The LED head 67 is located above the photosensitive drum 136 in the image forming main portion 111. The LED head 67 includes multiple light emitting element chips arranged linearly in the left-right direction, and causes light emitting elements of the light emitting element chips to emit light in a light emitting pattern based on an image data signal supplied from an image formation controller 205 to be described later (see FIG. 4).

The image forming main portion 111 is supplied with a driving force from a motor (not illustrated), thereby rotating the first supply roller 132, second supply roller 133, developing roller 134, and charging roller 137 in the directions of the arrows (clockwise in FIG. 2) and rotating the photosensitive drum 136 in the direction of the arrow (counterclockwise in FIG. 2). Further, the image forming main portion 111 applies respective predetermined bias voltages supplied from the image formation controller 205 (see FIG. 4), to the first supply roller 132, second supply roller 133, developing roller 134, developing blade 135, and charging roller 137, thereby charging them.

The first supply roller 132 and second supply roller 133 are charged to cause the developer in the developer storage space 131 to adhere to their peripheries, and are rotated to apply the developer to the periphery of the developing roller 134. The developing blade 135 removes excess developer from the periphery of the developing roller 134 to form a thin layer of developer on the periphery. The periphery of the developing roller 134 with the thin layer of developer formed thereon is brought into contact with the periphery of the photosensitive drum 136.

The charging roller 137 abuts the photosensitive drum 136 while being charged, thereby uniformly charging the periphery of the photosensitive drum 136. The LED head 67 emits light at predetermined time intervals in a light emitting pattern based on an image data signal supplied from the image formation controller 205 (see FIG. 4), thereby sequentially exposing the photosensitive drum 136. Thereby, an electrostatic latent image is sequentially formed on the periphery of the photosensitive drum 136, in the vicinity of an upper end of the photosensitive drum 136.

Then, rotation of the photosensitive drum 136 in the direction of the arrow brings the part with the electrostatic latent image formed thereon into contact with the developing roller 134. Thereby, developer adheres to the periphery of the photosensitive drum 136 based on the electrostatic latent image, thereby forming a developer image based on the image data. Further, rotation of the photosensitive drum 136 in the direction of the arrow brings the developer image to the vicinity of a lower end of the photosensitive drum 136.

As illustrated in FIG. 1, the intermediate transfer belt unit 30 is disposed below the ID units 61 in the housing 2. The intermediate transfer belt unit 30 includes a drive roller 41 that is driven by a drive source (not illustrated), a tension roller 43 that applies tension to the intermediate transfer belt 44, a pair of reverse bending rollers 63, a secondary transfer backup roller 42 that is disposed to face a secondary transfer roller 46 and constitutes the secondary transfer portion 47, and the intermediate transfer belt 44 that is stretched around these rollers.

The intermediate transfer belt unit 30 further includes five primary transfer rollers 45S, 45C, 45M, 45Y, and 45K that are disposed to respectively face the photosensitive drums 136 of the ID units 61S, 61C, 61M, 61Y, and 61K. When the primary transfer rollers 45S to 45K need not be distinguished from each other, they will be referred to simply as primary transfer rollers 45. Each primary transfer roller 45 primarily transfers a developer image formed on the photosensitive drum 136 facing the primary transfer roller 45, onto the intermediate transfer belt 44.

The intermediate transfer belt unit 30 primarily transfers developer images formed by the developed image forming unit 66 onto the intermediate transfer belt 44 as described above, and conveys the primarily transferred developer images to the secondary transfer portion 47. In the secondary transfer portion 47, the secondary transfer roller 46 secondarily transfers the developer images primarily transferred on the intermediate transfer belt 44 onto a recording sheet 71 fed from the pair of timing rollers 15.

A fixing unit 62 includes an upper roller 62*a* for heating that is driven and rotated in the direction of the arrow by a drive source (not illustrated), and a lower roller 62*b* for pressing that is pressed against and rotated by the upper roller 62*a*. The fixing unit 62 applies heat and pressure to a developer image on a recording sheet 71 fed from the secondary transfer portion 47 to fuse the developer image and fix the fused developer image to the recording sheet 71 while conveying the recording sheet 71 at a predetermined conveying speed with the recording sheet 71 nipped at the nip portion.

A first separator 51 is set to a discharge position for guiding a recording sheet 71 discharged from the fixing unit 62 and conveyed by a pair of discharge rollers 16 to pairs of discharge rollers 17, 18, 19, and 20 or a reprinting position for guiding the recording sheet 71 to a reprinting conveyor 32. The pairs of discharge rollers 17 to 20 discharge a recording sheet 71 guided by the first separator 51 to a face-down stacker 72.

The reprinting conveyor 32 includes a second separator 52 that determines the path of a recording sheet 71 guided by the first separator 51 set at the reprinting position, a pair of forward reverse rollers 21 that conveys a recording sheet 71 forward or backward in a switchback manner as needed, a third separator 53 that determines the path of a recording sheet 71, a pair of 2-path conveying rollers 22 that conveys a recording sheet 71 to be subjected to 2-path printing, a pair of double-sided printing conveying rollers 23 that conveys a recording sheet 71 to be subjected to double-sided printing, pairs of reprinting conveying rollers 24, 25, and 26 that reconvey a recording sheet 71 fed from them to the pair of timing rollers 15, and a retreat portion 27 that temporarily accommodates a recording sheet 71 in double-sided printing. The reprinting conveyor 32 may be configured as a unit.

Each of the roller pairs is supplied with power from a conveyance drive motor (not illustrated) through a drive transmission portion (not illustrated), and each of the separators is supplied with power for rotational position setting from a solenoid actuator (not illustrated) through a motion transmission portion.

In the reprinting conveyor 32 configured as described above, conveyance of a recording sheet 71 in 2-path printing will be described.

A recording sheet 71 that has been subjected to the first fixing by the fixing unit 62 (or the first printing) is guided to a 2-path printing path 28 by the second separator 52 set at an introduction position, the third separator 53 set at a 2-path printing position, and the pair of forward reverse rollers 21 operating for forward conveyance.

The recording sheet 71 that has been conveyed to the 2-path printing path 28 is conveyed in the direction of arrow C by the pair of 2-path conveying rollers 22 and pairs of reprinting conveying rollers 24, 25, and 26, returns to the pair of timing rollers 15 such that the surface (or front surface) subjected to the first printing is an upper surface (or a surface to be printed), and is subjected to the second printing (which is performed on the same surface of the same recording sheet). The first separator 51 is set to the discharge position, and the recording sheet 71 after the second printing is conveyed by the pairs of discharge rollers 16 to 20 and then discharged to the face-down stacker 72.

In this embodiment, the ID unit 61S containing the brilliant toner is used together with the other ID units 61Y, 61M, 61C, and 61K in 1-path printing, in which, for example, developer images are formed by the ID units 61S, 61C, 61M, 61Y, and 61K, sequentially transferred onto the intermediate transfer belt 44 in a superimposed manner, and transferred onto a recording sheet 71 at a time. However, this is not mandatory, and the ID unit 61S may be used in 2-path printing, in which, for example, in the first printing, color image printing is performed by forming developer images with the ID units 61C, 61M, 61Y, and 61K, sequentially transferring the developer images onto the intermediate transfer belt 44 in a superimposed manner, and transferring the developer images onto a recording sheet 71 at a time to form a color image, and in the second printing, special color image printing is performed by forming a brilliant toner image with the ID unit 61S and transferring the brilliant toner image onto the color image on the recording sheet 71.

Next, conveyance of a recording sheet 71 in the reprinting conveyor 32 in double-sided printing will be described.

A recording sheet 71 that has been subjected to single-sided printing is conveyed into the retreat portion 27 from its leading edge by the second separator 52 set at the introduction position, the third separator 53 set at a double-sided printing position, and the pair of forward reverse rollers 21 operating for forward conveyance.

When the trailing edge of the recording sheet 71 passes through the second separator 52 and the passage of the trailing edge is detected by, for example, the second separator 52, the pair of forward reverse rollers 21 reverses and rotates in a discharge direction while nipping the trailing edge of the recording sheet 71 and the second separator 52 is set to a discharge position.

Thereby, after being mostly accommodated in the retreat portion 27, the recording sheet 71 is conveyed backward to a double-sided printing path 29, is conveyed in the direction of arrow C by the pair of double-sided printing conveying rollers 23 and pairs of reprinting conveying rollers 24, 25, and 26 to return to the pair of timing rollers 15 such that the surface (or back surface) that has not yet been subjected to printing is an upper surface (or a surface to be printed), and is subjected to printing on the back surface in the same manner as in the printing on the front surface. The first separator 51 is set to the discharge position, and the recording sheet 71 after the double-sided printing is conveyed by the pairs of discharge rollers 16 to 20 and then discharged to the face-down stacker 72.

Figure 4:
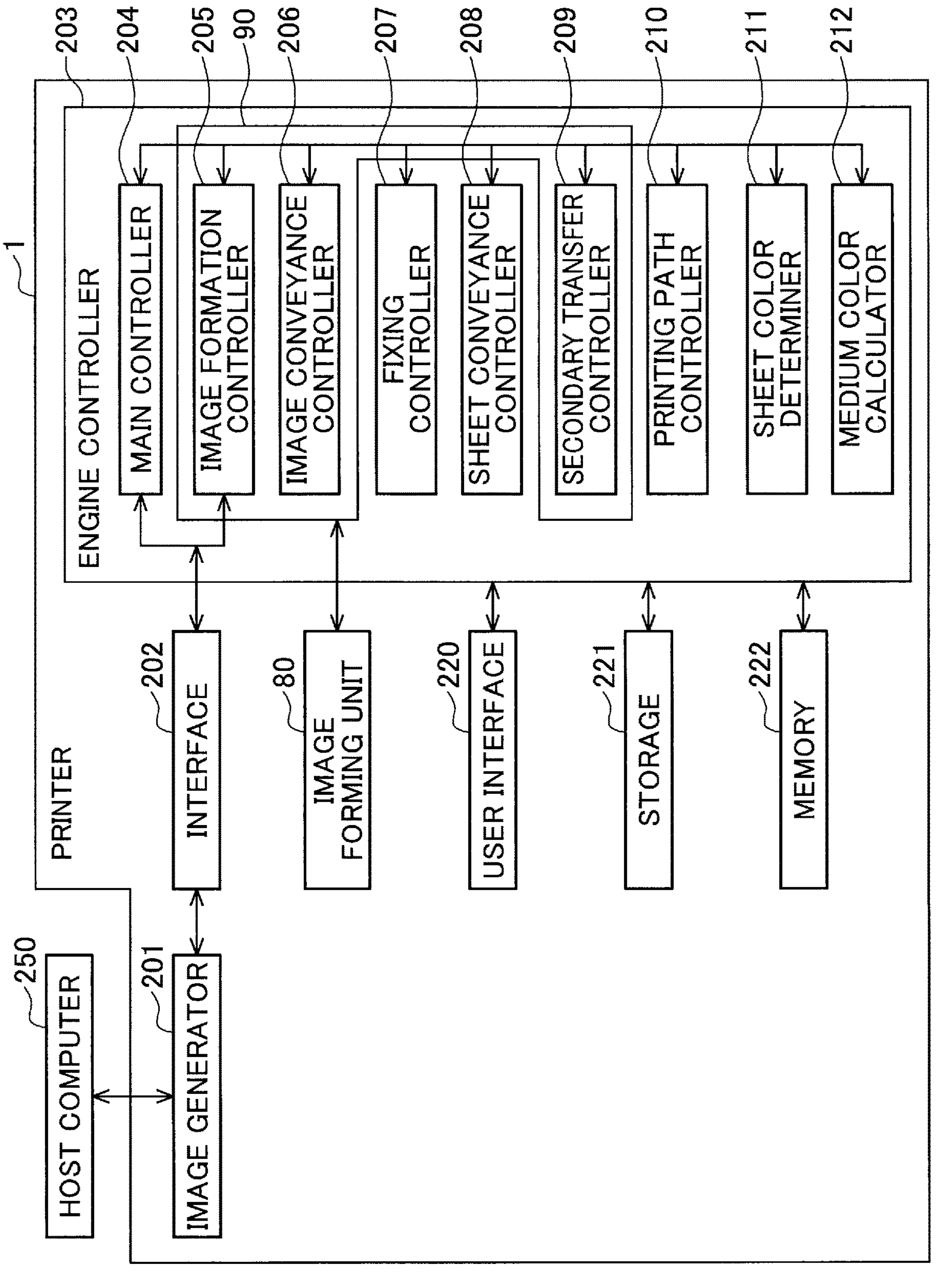
FIG. 4 is a block diagram illustrating a configuration of main parts of a portion relating to the present disclosure of a system of the printer of the embodiment.

FIG. 4 is a block diagram illustrating a configuration of main parts of a portion relating to the present disclosure of a system of the printer 1 of the present embodiment. The following description is made with reference to FIG. 4.

As illustrated in FIG. 4, the printer 1 includes an image generator 201 that receives print information from an external host computer 250 and analyzes the received print information, an engine controller 203 that controls engine operation, and an interface 202 that receives information required for engine control from the image generator 201 and communicates with the engine controller 203.

The engine controller 203 includes a main controller 204 that provides instructions for an operational process for image formation on the basis of information transmitted from the interface 202, the image formation controller 205 that controls operation for image formation, an image conveyance controller 206 that controls conveyance of a formed image, a fixing controller 207 that performs control of a fixing temperature or the like, a sheet conveyance controller 208 that monitors the position of a recording sheet 71 and controls conveyance of the recording sheet 71, a secondary transfer controller 209 that performs secondary transfer control, a printing path controller 210 that controls positional shift of the first to third separators 51 to 53, and a sheet color determiner 211 that determines the type of color of a recording sheet 71.

The image generator 201 receives print information from the host computer 250 to generate a print image, and transmits the print image to the engine controller 203 through the interface 202. The main controller 204, which is also a printing speed setter, provides instructions, including the printing speed, for an operational process for image formation, to the image formation controller 205, image conveyance controller 206, fixing controller 207, sheet conveyance controller 208, secondary transfer controller 209, and printing path controller 210.

The image formation controller 205 controls the ID units 61, LED heads 67, and the like of the developed image forming unit 66 to form toner images on the photosensitive drums 136. The image conveyance controller 206 controls the intermediate transfer belt unit 30 to transfer the toner images formed by the image formation controller 205 onto the intermediate transfer belt 44 and convey the toner images to the secondary transfer portion 47. The sheet conveyance controller 208 controls conveyance of a recording sheet 71 by all the roller pairs and the fixing unit 62, and the speed of the conveyance.

Also, the image formation controller 205 is configured to change the amount of brilliant toner of the image formed by the ID unit 61S for the special color. The amount can be changed by, for example, controlling the amount of exposure light from the LED head 67S, the voltage applied to the developing roller 134, the voltages applied to the first and second supply rollers 132 and 133, the voltage applied to the transfer roller 45S, and the like. In this embodiment, the image formation controller 205 changes the amount of brilliant toner of the image formed by the ID unit 61S for the special color, on the basis of a determination by the sheet color determiner 211 or a medium color calculator, as described later.

When a recording sheet 71 conveyed under control by the sheet conveyance controller 208 and toner images conveyed under control by the image conveyance controller 206 reach the secondary transfer portion 47, the secondary transfer controller 209 controls the secondary transfer portion 47 to secondarily transfer the toner images onto the recording sheet 71. The fixing controller 207 controls the fixing unit 62 to apply heat and pressure to a toner image on a recording sheet 71 to fuse the toner image and fix the image to the recording sheet 71.

The developed image forming unit 66, intermediate transfer belt unit 30, and secondary transfer portion 47 correspond to or constitute an image forming unit (or print engine) 80. The image formation controller 205, image conveyance controller 206, and secondary transfer controller 209 correspond to or constitute an image forming controller 90. The image forming unit 80 may form an image with the brilliant toner on a recording sheet 71. The image forming controller 90 may control the image forming unit 80.

In this embodiment, since the image forming apparatus uses an intermediate transfer system, the intermediate transfer belt unit 30 is included in the image forming unit. However, in the case of an image forming apparatus using a direct transfer system, since the image forming apparatus includes no intermediate transfer belt unit, a developed image forming unit that forms an image with a brilliant toner and a transfer unit that transfers the image onto a sheet correspond to the image forming unit.

The printing path controller 210 controls the first to third separators 51 to 53 to set the conveyance path of a recording sheet 71 in 2-path printing and double-sided printing.

Figures 5, 6:
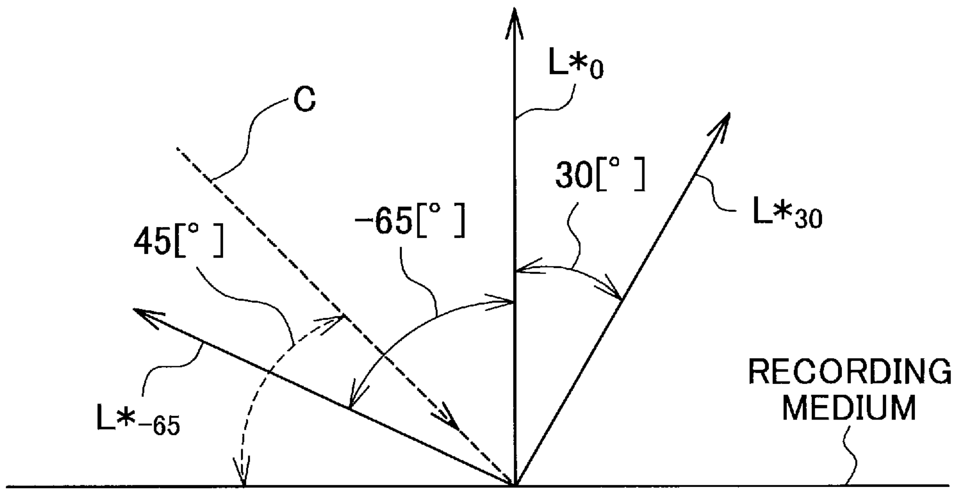
FIG. 5 is a diagram for explaining calculation of a flop index.
FIG. 6 is a table showing the flop indexes and specular reflectances of recording media before printing.

The sheet color determiner 211 as a medium color determiner determines the color of a recording sheet 71 on which an image is to be formed (or printed). The sheet color determiner 211 may determine whether the recording sheet 71 is white or colored. In this embodiment, the sheet color determiner 211 determines the sheet color on the basis of an operation by a user. Specifically, one or more buttons for sheet color selection are disposed in a user interface (e.g., a printer panel) 220, and the sheet color determiner 211 determines the sheet color by detecting an operation of the buttons by a user for selecting the sheet color. However, it is also possible that a storage 221 stores a correspondence table (e.g., as shown in FIG. 6) in which the names (or types) of recording media are associated with flop indexes $FI_0$ (to be described later) of the recording media, one or more buttons for medium name (or type) selection are disposed in the user interface 220, and when the name (or type) of the recording medium is selected with the buttons, a medium color calculator 212 determines the flop index $FI_0$ of the recording medium on the basis of the correspondence table. In this case, the sheet color determiner 211 may determine the sheet color on the basis of the determined flop index $FI_0$.

It is also possible that a sheet color measurement unit 11*a* as a medium color calculator is provided in the sheet feeding cassette 11 (see FIG. 1) and determines the flop index of the recording sheet 71, and the sheet color determiner 211 determines the sheet color on the basis of the determined flop index. It is also possible that the sheet color determiner 211 determines the sheet color on the basis of the flop index directly input through the user interface 220 by a user.

The engine controller 203 may be processing circuitry. For example, the engine controller 203 may be a processor that executes a program stored in a memory 222 to provide the above functions of the engine controller 203, or may be dedicated hardware.

In FIG. 4, the above system including the engine controller 203, user interface 220, storage 221, and memory 222 is provided in the printer 1. However, part or all of the system may be provided outside the printer 1.

Next, production of the brilliant toner for providing brilliance to a printed image contained in the developer container 112 of the ID unit 61S for the special color will be described. Brilliant toner A was produced as follows.

An aqueous medium with an inorganic dispersant dispersed therein was first obtained. Specifically, 920 parts by weight of industrial trisodium phosphate dodecahydrate was mixed with 27000 parts by weight of pure water, and dissolved therein at a liquid temperature of 60° C. Then, the resulting liquid was added with dilute nitric acid for pH adjustment. The resulting liquid was added with an aqueous calcium chloride solution obtained by dissolving 440 parts by weight of industrial calcium chloride anhydride in 4500 parts by weight of pure water, and was high-speed stirred with a Line Mill (manufactured by Primix Corporation) at a rotation speed of 3566 rpm for 34 minutes while being maintained at a liquid temperature of 60° C. Thereby, an aqueous phase containing a suspension stabilizer (or inorganic dispersant) was prepared.

Meanwhile, a pigment dispersion oil medium was obtained. Specifically, a pigment dispersion liquid was prepared by mixing 680 parts by weight of a brilliant pigment (having a volume median size of 5.4 μm) and 30 parts by weight of a charge control agent (BONTRON E-84, manufactured by Orient Chemical Industries Co., Ltd.) with 7430 parts by weight of ethyl acetate. Then, the pigment dispersion liquid was heated to 55° C. and stirred, added with 260 parts by weight of an ester wax (WE-4, manufactured by NOF Corporation) and 2430 parts by weight of polyester resin, and stirred until solid dissolved. Thereby, an oil phase was prepared.

The oil phase was added to the aqueous phase that had been cooled to 55° C., and suspended by stirring for 5 minutes at a rotation speed of 1000 rpm, so that particles were formed. Then, the ethyl acetate was removed by distilling under reduced pressure.

The slurry containing the particles was added with nitric acid so that the pH of the slurry was adjusted to 1.6 or lower, and was stirred. Tricalcium phosphate as a suspension stabilizer was dissolved therein, and the mixture was dehydrated. Then, the dehydrated particles were re-dispersed in pure water, stirred, and water-washed. After that, through dehydration, drying, and classification, toner base particles were produced. The toner base particles were collected by the classification process.

Then, in an external addition process, the collected toner base particles were added and mixed with 1.0 wt % of small silica (AEROSIL RY200, manufactured by Nippon Aerosil Co., Ltd.) and 1.5 wt % of colloidal silica (X-24-9163A, manufactured by Shin-Etsu Chemical Co., Ltd.), so that brilliant toner A having a volume median size of 12.79 μm was obtained.

The volume median size (Dv50) refers to the particle size at which the cumulative volume percentage is 50%. Here, for each of the brilliant pigment and brilliant toner A, the volume median size was measured by using an accurate particle size distribution analyzer (Multisizer 3, manufactured by Beckman Coulter, Inc.) under the following measurement conditions:

Aperture diameter: 100 μm

Electrolyte: ISOTON II (manufactured by Beckman Coulter, Inc.)

Dispersion liquid: a liquid obtained by dissolving NEOGEN S-20F (manufactured by DKS Co., Ltd.) in the above electrolyte and adjusting the concentration to 5%

Multisizer 3 from Beckman Coulter, Inc. is a particle size distribution measurement device based on the Coulter principle. The Coulter principle is a method, called aperture electrical resistance method, of measuring the volume of a particle by passing a constant current through an aperture in an electrolyte solution and measuring a change in the electrical resistance across the aperture when the particle passes through the aperture.

Here, 10 to 20 mg of the measurement sample was added to 5 ml of the dispersion liquid, dispersed with an ultrasonic disperser for 1 minute, added with 25 ml of the electrolyte, dispersed with the ultrasonic disperser for 5 minutes, and passed through a mesh having an opening size of 75 μm to remove aggregates, so that a sample dispersion liquid was prepared. The sample dispersion liquid was added to 100 ml of the electrolyte, and 30000 particles were measured. Then, the volume median size was determined from the volume particle size distribution of the 30000 particles.

As a comparative example, brilliant toner B having a volume median size of 13.45 μm was produced in the same manner as brilliant toner A except that a brilliant pigment having a volume median size of 8.7 μm was used.

With brilliant toners A and B as experimental samples, a brilliance printing experiment was performed on recording media of different colors as described below.

The printing experiment was performed by using an experimental printer (C941dn, manufactured by Oki data Corporation). The configuration of main parts necessary for the printing experiment of the experimental printer is the same as the configuration of the printer 1 illustrated in FIG. 1. Thus, the printing experiment will be described with reference to the printer 1 in FIG. 1. In the description of the printing experiment, media referred to as recording sheets 71 in FIG. 1 will be referred to as recording media.

Brilliant toner A was put in the developer container 112 of the ID unit 61S for the special color (S), and a 100% solid image (having a print image density of 100%) was printed with brilliant toner A on each of the following recording media of different colors while the amount (referred to below as the brilliant toner deposition amount) of brilliant toner per unit area of the brilliant toner image formed on the recording medium before fixing by the fixing unit 62 was adjusted to each value shown in FIG. 7 (to be described later). In the printing, the conveyance speed (i.e., printing speed) of the recording medium was 18 ppm (in A4 landscape printing), and the fixing temperature of the fixing unit 62 was 160° C.

In the brilliance printing experiment, the ID units 61 other than the ID unit 61S were removed from a main body of the printer 1 and not used.

Similarly, as a comparative example, brilliant toner B was put in the developer container 112 of the ID unit 61S for the special color (S), and the 100% solid image was printed with brilliant toner B on each of the following recording media of different colors while the brilliant toner deposition amount was adjusted to each value shown in FIG. 9 (to be described later).

The recording media used in the experiment were

- a white paper sheet (OS coated paper W of 127 g/m$^2$, manufactured by Fuji Xerox CO., Ltd.),
- a black paper sheet (colored high quality paper of black, heavy paper, and 90 g/m$^2$, manufactured by Hokuetsu Corporation),
- a blue paper sheet (colored high quality paper of blue, heavy paper, and 90 g/m$^2$, manufactured by Hokuetsu Corporation), and
- a red paper sheet (colored high quality paper of red, heavy paper, and 90 g/m$^2$, manufactured by Hokuetsu Corporation).

The brilliance (or metallic luster) of each of the recording media before printing and the printed 100% solid images was measured by using a variable angle photometer (GC-5000L, manufactured by Nippon Denshoku Industries Co., Ltd.). Specifically, as illustrated in FIG. 5, with the variable angle photometer, the recording medium was illuminated with a light ray C at an angle of 45° relative to the surface of the recording medium, light reflected by the recording medium was received at angles 0°, 30°, and −65° relative to a direction perpendicular to the surface of the recording medium, and lightness indexes $L^*_0$, $L^*_{30}$, and $L^*_{-65}$ were respectively calculated from the light reception results obtained at 0°, 30°, and −65°. Then, the brilliance of the recording medium or image was determined by calculating a flop index FI by substituting the lightness indexes into the following equation:

$$FI=2.69\times(L^*_{30}-L^*_{-65})^{1.11}/(L^*_0)^{0.86}.$$

For each of the solid images, an increase in brilliance due to printing was evaluated by using a value (referred to here as a print brilliance score) ΔFI obtained by subtracting the flop index $FI_0$ of the recording medium before printing from the flop index of the solid image. The greater the print brilliance score ΔFI, the greater the increase in brilliance due to printing. When the score ΔFI was not less than 7.0, the increase in brilliance due to printing was determined to be good.

For comparison between the flop indexes $FI_0$ and specular reflectances of the recording media before printing, the specular reflectances (or glosses) of the recording media before printing were measured by using a surface gloss meter (micro-gloss 75°, manufactured by BYK-Gardner).

For white recording media, to determine the differences between the flop indexes $FI_0$ and specular reflectances, the flop indexes and specular reflectances (or glosses) of the following recording media, which were not used for the brilliance printing experiment, were measured, and compared:

Excellent Gloss of 128 g/m$^2$, manufactured by Oki data Corporation,

Color Copy of 250 g/m$^2$, manufactured by Mondi, and

Excellent White of 80 g/m$^2$, manufactured by Oki data Corporation.

FIG. 6 is a table showing the flop indexes $FI_0$ and specular reflectances of the recording media of the respective colors before printing.

Figures 7, 8:
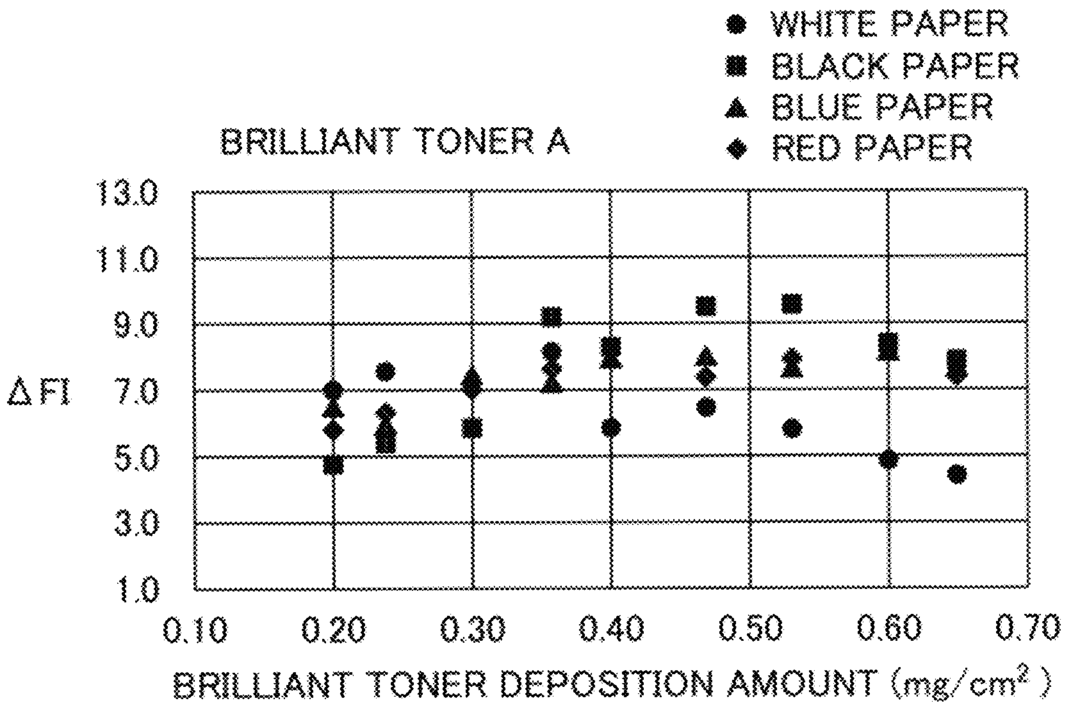
FIG. 7 is a table showing printing brilliance scores ΔFI of brilliant toner A.
FIG. 8 is a graph obtained by plotting the printing brilliance scores ΔFI shown in FIG. 7.

FIG. 7 is a table showing the print brilliance scores ΔFI obtained by printing the 100% solid image with brilliant toner A on the recording media of the respective colors while setting the brilliant toner deposition amount to each of the multiple values as described above. FIG. 8 is a graph obtained by plotting the values of FIG. 7.

Figures 9, 10:
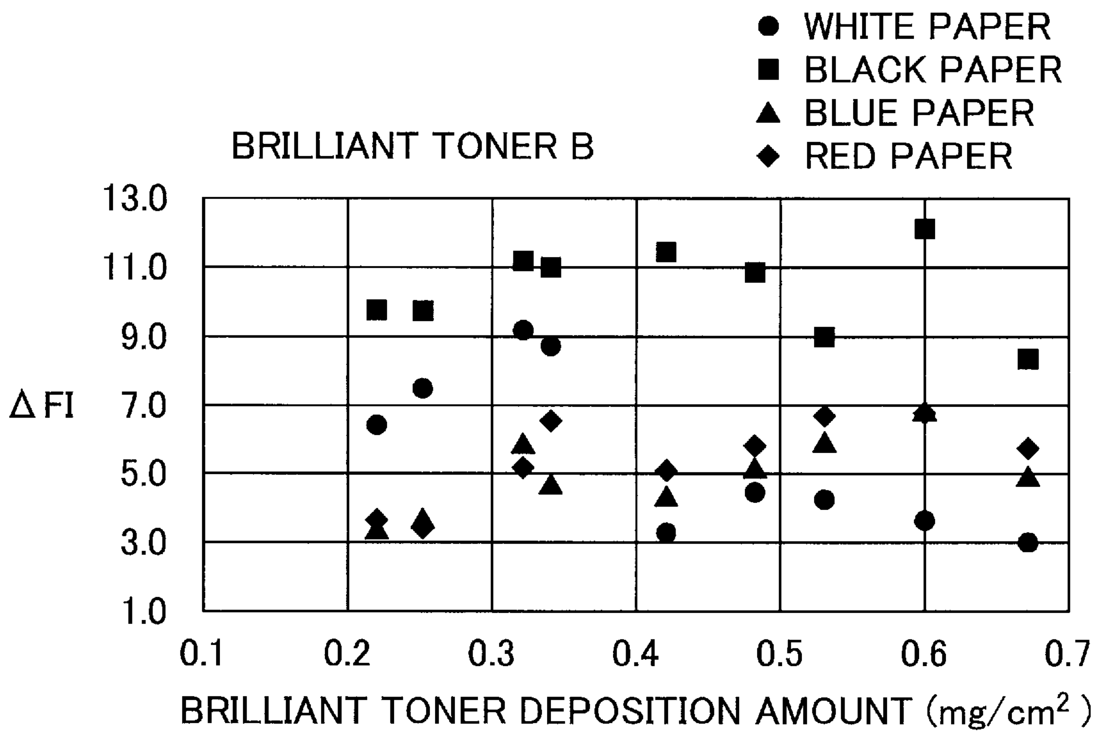
FIG. 9 is a table showing printing brilliance scores ΔFI of brilliant toner B.
FIG. 10 is a graph obtained by plotting the printing brilliance scores ΔFI shown in FIG. 9.

FIG. 9 is a table showing the print brilliance scores ΔFI obtained by printing the 100% solid image with brilliant toner B (as the comparative example) on the recording media of the respective colors while setting the brilliant toner deposition amount to each of the multiple values. FIG. 10 is a graph obtained by plotting the values of FIG. 9.

FIG. 6 shows that for the white recording media, the highest specular reflectance is 69.8%, the lowest specular reflectance is 8.2%, and the difference is great, whereas the flop indexes $FI_0$ of the white recording media are not greatly different and depend on the color. Thus, it is conceivable that the specular reflectance and flop index $FI_0$ are completely different parameters.

From the experimental results of FIG. 6, it is possible to determine that a recording medium is colored when the flop index $FI_0$ is not less than 7.0, and that the recording medium is white when the flop index $FI_0$ is not greater than 5.6. Thus, the sheet color determiner 211 (see FIG. 4) determines that a recording sheet 71 stored in the sheet feeding cassette 11 is colored when the flop index of the recording sheet 71 is not less than 7.0, and that the recording sheet 71 stored in the sheet feeding cassette 11 is white when the flop index of the recording sheet 71 is not greater than 5.6. As described above, the flop index of the recording sheet 71 is input through the user interface 220. Alternatively, when the sheet color measurement unit 11*a* is provided in the sheet feeding cassette 11, the flop index of the recording sheet 71 is determined from information indicating the flop index of the recording sheet 71 obtained by measurement by the sheet color measurement unit 11*a*.

In this embodiment, the sheet color determiner 211 determines that a recording medium is white when the flop index of the recording medium is not greater than 5.6, and that the recording medium is colored when the flop index is not less than 7.0. However, the sheet color determiner 211 may determine whether a recording medium is white or colored, by using a predetermined flop index as a threshold. The predetermined flop index may be, for example, 6.3, which is a middle value between the flop indexes 5.6 and 7.0.

As shown in FIGS. 7 and 8, in the case of using brilliant toner A with brilliant pigment having a small particle size, for the white recording medium, when the brilliant toner deposition amount is not greater than a specific amount, the score ΔFI is stable within a range of 7.0 or higher, and when the brilliant toner deposition amount is greater than the specific amount, there is a tendency that the score ΔFI decreases as the brilliant toner deposition amount increases. On the other hand, for each of the colored recording media of black, blue, and red, when the brilliant toner deposition amount is not less than a specific amount, the score ΔFI is stable within a range of 7.0 or higher, and when the brilliant toner deposition amount is less than the specific amount, there is a tendency that the score ΔFI decreases as the brilliant toner deposition amount decreases.

When the amount of brilliant toner per unit area of a brilliant toner image on a recording medium is small, the space between the brilliant pigment particles is large on the printed surface after fixing, and the recording medium can be seen through the space. Since the white recording medium has a very high reflectance for white light, even when a brilliant toner image is formed on the white recording medium such that the white recording medium can be seen through the space between the brilliant pigment particles, the brilliance is high.

Also, since the flop index of the white recording medium before printing is 4.0 and low, even when a brilliant toner image is formed on the white recording medium with a small brilliant toner deposition amount, the flop index of the brilliant toner image is sufficiently higher than the flop index of the recording medium. On the other hand, as the brilliant toner deposition amount increases, the amount of brilliant pigment increases, the space reduces, and the brilliant pigment particles aggregate, which reduces reflection of illumination light and reduces the brilliance.

For each of the colored recording media of black, blue, and red, when the recording medium is illuminated with white light, it absorbs light other than the light of the color of the recording medium, which reduces the reflected light. Thus, when a brilliant toner image is formed on the recording medium with a small brilliant toner deposition amount such that the recording medium can be seen through the space between the brilliant pigment particles, the brilliance is low. On the other hand, as the brilliant toner deposition amount increases, the pigment aggregation increases, but the space between the brilliant pigment particles decreases, which reduces absorption of white light by the recording medium and increases the brilliance. Also, since the flop index of the recording medium before printing is high, a large amount of brilliant pigment is required to make the flop index of the brilliant toner image sufficiently higher than the flop index of the recording medium.

For brilliant toner B, which was used as a comparative example in the brilliance printing experiment, the particle size of the brilliant pigment is greater than that of brilliant toner A, but the particle size of the toner itself is substantially the same as that of brilliant toner A. Thus, the number of brilliant pigment particles included in a toner particle is less than that of brilliant toner A.

When the amount of brilliant toner per unit area of a brilliant toner image formed on a recording medium with brilliant toner B is the same as the amount of brilliant toner per unit area of a brilliant toner image formed on a recording medium with brilliant toner A, the number of brilliant pigment particles per unit area of the toner image formed on the recording medium with brilliant toner B is less than that of the toner image formed on the recording medium with brilliant toner A. Thus, for brilliant toner B, as shown in FIGS. 9 and 10, in particular in the blue and red recording media, even when the brilliant toner deposition amount is increased, since the recording medium can be seen through the space between the brilliant pigment particles, the brilliance is not sufficiently increased.

In the above example, brilliant toner A containing the brilliant pigment having a volume median size of 5.4 μm was used. However, it is conceivable that brilliant toners containing brilliant pigments having volume median sizes less than 5.4 μm also provide the same effects.

From the above experimental results, in performing printing with a brilliant toner containing a brilliant pigment having an appropriate volume median size (here 5.4 μm), in order to obtain a good score ΔFI (here not less than 7.0), it is preferable to make the brilliant toner deposition amount not greater than a predetermined value (specifically 0.36 $mg/cm^2$) when the recording medium is white, and make the brilliant toner deposition amount not less than a predetermined value (specifically 0.36 $mg/cm^2$) when the recording medium is not white and colored (here black, blue, or red).

Also, it can be seen that there is a tendency that when printing is performed on a colored recording medium, increasing the brilliant toner deposition amount increases the score ΔFI better than when printing is performed on a white recording medium.

For each of the recording media of the respective colors (white, black, blue, and red), an experiment was performed to determine how the flop index of the recording medium after printing varies with the printing speed.

The experiment was performed under the following conditions. Density adjustment parameters for adjusting the brilliant toner deposition amount were fixed. Specifically, the voltage applied to the developing roller 134 was set at −200 V, and the voltages applied to the first and second supply rollers 132 and 133 were set at −360 V. The 100% solid image was printed on the recording medium at different printing speeds.

The printing was performed by the experimental printer (C94ldn, manufactured by Oki data Corporation) using brilliant toner A, as with the brilliance printing experiment.

The printing speeds were 18, 22, 27, 32, and 40 ppm (in A4 landscape printing), as shown in FIG. 11. The A4 landscape printing indicates that the recording medium has a size of A4 and is conveyed with its longitudinal direction parallel to its conveyance direction. The flop index of the recording medium after the printing at each printing speed was measured. FIG. 11 show the experimental results. FIG. 11 also shows the linear speed at which the recording medium is conveyed.

FIG. 11 shows that for the white recording medium, the flop index after printing increases as the printing speed decreases, whereas for the colored recording media of black, blue, and red, the flop index after printing varies little with the printing speed.

On the basis of the results of the above experiments, the printer 1 of the present embodiment performs setting so that when the sheet color determiner 211 determines that the recording sheet 71 to be used for printing is colored (or not white), the brilliant toner deposition amount is increased as compared to when printing is performed on a white recording sheet 71. The printer 1 may set the brilliant toner deposition amount to be not less than a predetermined value (here 0.36 mg/cm$^2$) when the recording sheet is determined to be colored (or not white), and set the brilliant toner deposition amount to be less than a predetermined value (here 0.36 mg/cm$^2$) when the recording sheet is determined to be white.

Also, when the sheet color determiner 211 determines that the recording sheet 71 to be used for printing is white, by decreasing the printing speed, it is possible to increase (or improve) the flop index after printing. Thus, when printing is performed on a white recording sheet 71, the printer 1 of the present embodiment sets the printing speed to be lower than the printing speed set when printing is performed on a colored recording sheet 71, whose flop index varies little with the printing speed. This increases (or improves) the flop index of the white recording sheet 71 after printing.

The printer 1 may be configured as follows.

When the sheet color determiner 211 determines that the recording sheet 71 is colored, the image forming controller 90 may increase the amount of the brilliant toner per unit area of the image formed on the recording sheet 71 as compared to when the recording sheet 71 is white.

The sheet color determiner 211 may determine whether the recording sheet 71 is white or colored, on the basis of the flop index of the recording sheet 71.

When the sheet color determiner 211 determines that the flop index of the recording sheet 71 is not less than 7.0, the image forming controller 90 may make the amount of the brilliant toner per unit area of the image not less than a predetermined value.

When the sheet color determiner 211 determines that the flop index of the recording sheet 71 is not greater than 5.6, the image forming controller 90 may make the amount of the brilliant toner per unit area of the image less than a predetermined value.

The flop index of the recording sheet 71 may be obtained by the medium color calculator 11*a* or 212 provided in the printer 1.

When the sheet color determiner 211 determines that the recording sheet 71 is white, the main controller 204 may decrease the printing speed as compared to when the sheet color determiner 211 determines that the recording sheet 71 is colored.

When the recording sheet 71 is colored, the image forming controller 90 may increase the amount of the brilliant toner per unit area of the image formed on the recording sheet 71 as compared to when the recording sheet 71 is white.

When the recording sheet 71 is a first medium having a first flop index, the image forming controller 90 may increase the amount of the brilliant toner per unit area of the image formed on the recording sheet 71 as compared to when the recording sheet 71 is a second medium having a second flop index less than the first flop index.

As described above, when performing printing with a brilliant toner, the printer 1 of the present embodiment can provide good brilliance regardless of whether the recording medium is white or colored.

In the present embodiment, the medium color determiner for determining whether the recording medium is colored or white is provided in the printer. However, as a modification, it is possible that the medium color determiner is provided on a printer driver installed in a personal computer as a host device, the printer driver transmits information indicating the medium color to the printer along with a printing instruction, and the printer changes the brilliant toner deposition amount on the basis of the transmitted information. Specifically, when the recording medium is a first medium that is colored, the image forming controller may increase the brilliant toner deposition amount as compared to when the recording medium is a second medium that is white.

For example, when the information transmitted to the printer indicates that the recording medium is colored, the image forming controller sets the voltage applied to the developing roller 134 to −290 V and the voltages applied to the first and second supply rollers 132 and 133 to −450 V, thereby setting the brilliant toner deposition amount to approximately 0.60 mg/cm$^2$. On the other hand, when the transmitted information indicates that the recording medium is white, the image forming controller sets the voltage applied to the developing roller 134 to −110 V and the voltages applied to the first and second supply rollers 132 and 133 to −270 V, thereby setting the brilliant toner deposition amount to approximately 0.20 mg/cm$^2$.

As a result, when the recording medium is colored, the brilliant toner deposition amount is increased by the image forming controller as compared to when the recording medium is white, and thus a good brilliance can be obtained.

As another modification, it is possible that the medium color determiner is provided on a server capable of communicating with the printer. It is possible that when a type of recording medium is selected through one or more buttons for medium type selection provided in a user interface (e.g., printer panel) of the printer, the printer transmits the selection result to the server, the medium color determiner provided on the server determines the color of the recording medium and transmits the determination result to the printer, and the printer changes the brilliant toner deposition amount on the basis of the transmitted result.

In the above embodiment, the present disclosure has been described by taking a color electrophotographic printer as an example. However, the present disclosure is not limited to this, and applicable to image forming apparatuses, such as copiers, facsimile machines, and multi-function peripherals (MFPs), that form images on recording media by electrophotography. Also, although a color printer has been described, the present disclosure is applicable to monochrome printers.

What is claimed is:

1. An image forming apparatus, comprising:

a print engine that forms an image with a brilliant toner on a recording medium to be used for printing; and processing circuitry to determine whether the recording medium is white or colored and to control the print engine, wherein the processing circuitry determines whether the recording medium is white or colored, on a basis of a flop index of the recording medium, wherein when the processing circuitry determines that the recording medium is colored, the processing circuitry increases an amount of the brilliant toner per unit area of the image formed on the recording medium as compared to when the processing circuitry determines that the recording medium is white.

2. The image forming apparatus of claim 1, wherein when a value of the flop index of the recording medium is not less than 7.0, the processing circuitry makes the amount of the brilliant toner per unit area of the image not less than a predetermined value.

3. The image forming apparatus of claim 1, wherein when a value of the flop index of the recording medium is not greater than 5.6, the processing circuitry makes the amount of the brilliant toner per unit area of the image less than a predetermined value.

4. The image forming apparatus of claim 1, wherein a value of the flop index is obtained by the processing circuitry.

5. The image forming apparatus of claim 1, wherein
the printer engine includes a plurality of image drum units, each having a detachable developer container containing toner of a different color, and
the brilliant toner is provided in one of the detachable developer containers, the brilliant toner containing a brilliant pigment having a volume median size not greater than 5.4 μm.

6. The image forming apparatus of claim 1, wherein the processing circuitry sets a printing speed slower when the recording medium is determined to be white and the brilliant toner image is formed on the recording medium than when the recording medium is determined to be colored and the brilliant toner image is formed on the recording medium.

7. An image forming apparatus, comprising:
a print engine that forms an image with a brilliant toner on a recording medium; and
processing circuitry to control the print engine,
wherein when the recording medium is a first medium having a first flop index, the processing circuitry increases an amount of the brilliant toner per unit area of the image formed on the recording medium as compared to when the recording medium is a second medium having a second flop index less than the first flop index.

* * * * *